(12) United States Patent
Jeong (10) Patent No.: US 7,340,544 B2
(45) Date of Patent: Mar. 4, 2008

(54) METHOD OF USING BUS AND BUS INTERFACE

(75) Inventor: Young-hoon Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 143 days.

(21) Appl. No.: 11/035,426

(22) Filed: Jan. 14, 2005

(65) Prior Publication Data

US 2005/0177663 A1   Aug. 11, 2005

(30) Foreign Application Priority Data

Jan. 17, 2004  (KR) ...................... 10-2004-0003581

(51) Int. Cl.
*G06F 13/36* (2006.01)
*G06F 15/16* (2006.01)

(52) U.S. Cl. ...................................... 710/110; 345/504

(58) Field of Classification Search ................ 710/110, 710/309, 113, 114; 345/503, 504, 520; 348/46
See application file for complete search history.

(56) References Cited

U.S. PATENT DOCUMENTS 5,369,744 A * 11/1994 Fukushima et al. ......... 345/501
5,517,325 A *  5/1996 Shimatani ................... 358/444
5,963,200 A * 10/1999 Deering et al. ............. 345/213
6,032,178 A *  2/2000 Bacigalupo et al. ........ 709/208
6,401,142 B1 *  6/2002 Williams et al. ............. 710/14
6,463,494 B1 * 10/2002 Morriss et al. ............. 710/305
6,496,277 B1 * 12/2002 Chapin et al. ............. 358/1.16
2001/0007999 A1  7/2001 Rasmussen et al. .......... 710/60

FOREIGN PATENT DOCUMENTS

| JP | 10-207821 | 8/1998 |
| JP | 2001-101128 | 4/2001 |
| JP | 2001-135010 | 5/2001 |
| JP | 2002-334050 | 11/2002 |
| JP | 2002-334053 | 11/2002 |
| KR | 100221028 | 6/1999 |
| KR | 1020000046342 | 7/2000 |
| KR | 1020010019736 | 3/2001 |
| KR | 1020010056115 | 7/2001 |

\* cited by examiner

*Primary Examiner*—Glenn A. Auve
*Assistant Examiner*—Trisha Vu
(74) *Attorney, Agent, or Firm*—Staas & Halsey LLP (57) ABSTRACT

A method of using a bus, includes: determining whether a subject unit among a plurality of units corresponding to masters obtaining a bus use permission from an arbiter uses the bus as a master to transfer data to/from a first unit corresponding to a slave; and converting the first unit into a master when the subject unit does not use the bus in order to allow the first unit to use the bus as a master, when the subject unit is determined not to be using the bus.

19 Claims, 6 Drawing Sheets

METHOD OF USING BUS AND BUS INTERFACE

CROSS-REFERENCE TO RELATED APPLICATION

This application claims the priority of Korean Patent Application No. 10-2004-0003581, filed on Jan. 17, 2004, in the Korean Intellectual Property Office, the disclosure of which is incorporated herein in by reference.

BACKGROUND OF THE INVENTION

1. Field of the Invention

The present invention relates to a bus system, and more particularly, to a method of using a bus capable of efficiently transferring a large amount of data and a bus interface in a bus system.

2. Description of Related Art

Figure 1:
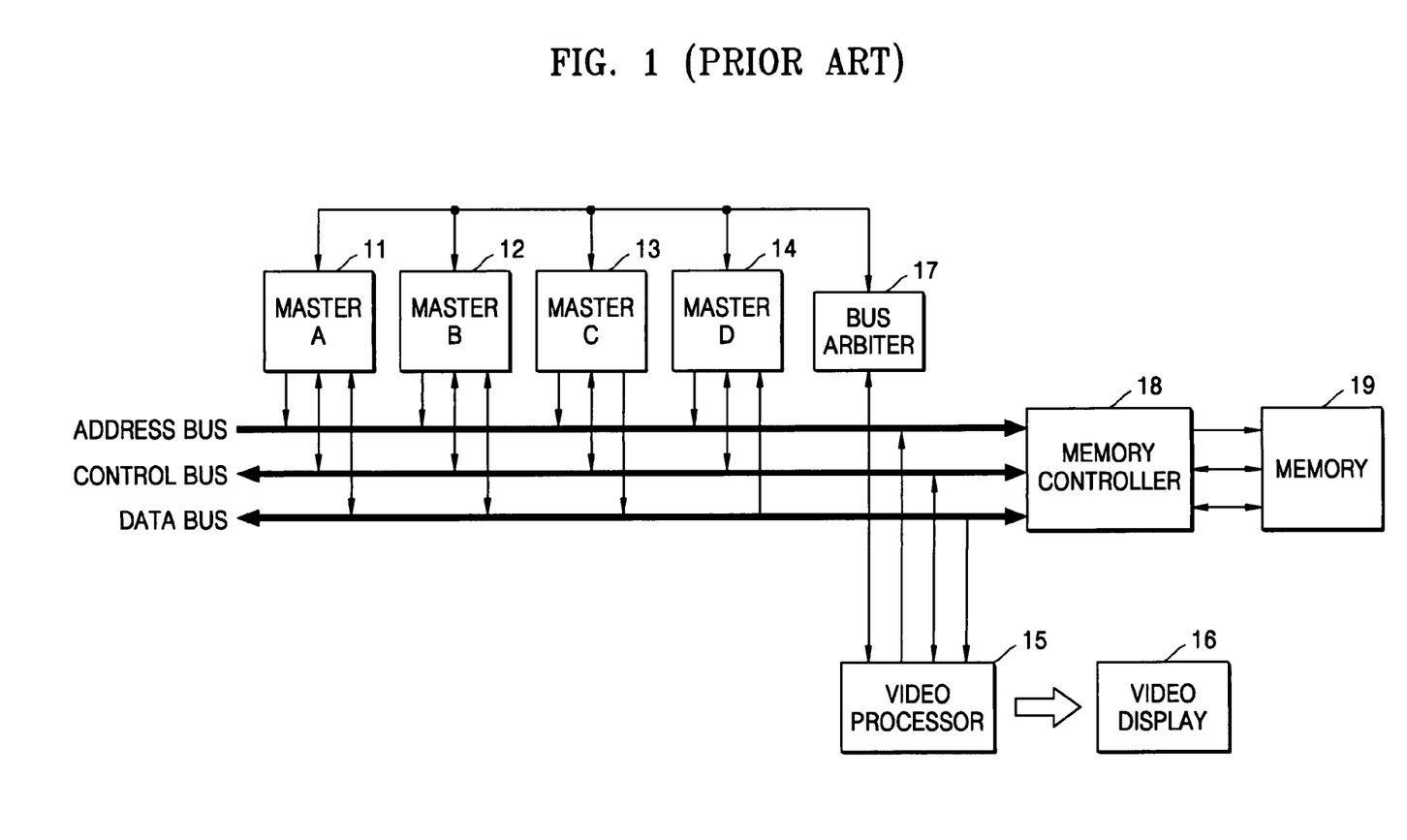
FIG. 1 is a block diagram showing a structure of a conventional bus system.

Referring to FIG. 1, a conventional bus system includes masters A-D respectively denoted by reference numerals 11-14, a video processor 15, a video display 16, a bus arbiter 17, a memory controller 18, and a memory 19. In the following description, the video processor 15 corresponds to a master, and the memory 19 corresponds to a slave. The memory controller 18 is a unit for controlling only the memory 19, and is installed in a front end of the memory 19. All the data transferred to the memory 19 pass through the memory controller 18 and then arrive at the memory 19. Therefore, the memory controller 18 instead of the memory 19 has been typically called a slave. Hereinafter, the memory controller 18 will be called a slave. Otherwise, a memory 19 will be called a slave in a special case. A line which connects masters 11-14 with the memory controllers corresponding to a slave is called a bus. Such a bus is composed of an address bus which loads (or carries) addresses, a control bus which loads control signals, and a data bus which loads data.

The masters 11-14 are units which actively use the bus. The masters 11-14 generate addresses and control signals needed to transmit data by way of the bus, and send bus use requests to the bus arbiter 17. Then, the addresses are loaded on the address bus, and control signals are loaded on the control bus when use is granted by the bus arbiter 17 which receives the bus use request. In addition, data are loaded on a data bus when a response signal is received.

The bus arbiter 17 receives a bus use request from each of the masters 11-15 and grants permission to each of the masters 11-15. Typically, since the bus can be used by only one master at a time, only one of the masters 11-15 is granted the use permission at a time based on the order of the use requests and priorities of the masters 11-15. The memory controller 18 corresponding to a slave is a unit which passively uses the bus. The memory controller 18 receives addresses and control signals transmitted from the master which has been granted the use permission by the bus arbiter 17, and transmits a response signal to the masters 11-15.

According to the above conventional bus system, two kinds of waiting times are needed to complete a cycle of data transmission. That is, a waiting time for transmitting addresses and control signals from the master obtaining the use permission as a result of arbitrating the bus to the memory controller 18 corresponding to a slave, and the other waiting time for reading/writing data from a memory controller 18 corresponding to a slave to the memory 19 corresponding to the destination. As a result, during the waiting time the bus is not used and bus use efficiency is degraded. In addition, when a plurality of masters send bus use requests at the same time, a bottleneck is generated which causes increased waiting times.

BRIEF SUMMARY

An aspect of the present invention provides a method and an apparatus for actively transmitting data from a unit converted from a slave into a master to a unit converted from a master into a slave during no master uses the bus.

According to an aspect of the present invention, there is provided a method of using a bus, including: determining whether a subject unit among a plurality of units corresponding to masters obtaining a bus use permission from an arbiter uses the bus as a master to transfer data to/from a first unit corresponding to a slave; and converting the first unit into a master when the subject unit does not use the bus in order to allow the first unit to use the bus as a master, when the subject unit is determined not to be using the bus.

According to another aspect of the present invention, there is provided a bus interface including: a bus status inspection unit which inspects a bus status and then outputs a master-slave conversion instruction indicating that a unit corresponding to a slave is to be converted into a master in order to allow the unit to use the bus as a master, when it is determined that the bus is idle as a result of the inspection; and a data read information generator unit which generates data read information for reading specified data from the unit converted into a master, when the master-slave conversion instruction output from the bus status inspection unit is received, and which transmits the generated data read information to the unit.

According to still another aspect of the present invention, there is provided a master-slave conversion method including: inspecting bus status when a master-slave conversion notice indicating that a first unit corresponding to a master has been converted into a slave is received from the first unit; and generating master-slave conversion information for converting a second unit corresponding to a slave into a master in order to allow the second unit to use the bus as a master when it is determined that the bus is idle as a result of the inspecting, and transmitting the master-slave conversion information to the second unit.

According to still another aspect, there is provided a method of decreasing bus congestion, including: converting a first unit from a master to a slave, when a first amount of data received by the first unit is sufficient to accomplish a first specified task; determining whether the bus is usable by the first unit; converting a second unit from a slave into a master and actively using the bus via the second unit, when the bus is usable by the first unit; actively using the bus via a third unit, when the bus is not usable by the first unit; determining, after the converting and the using, whether a second amount of data received by the first unit is sufficient to accomplish a second task; and re-converting the first unit from a slave to a master, when the second amount of data is sufficient to accomplish the second task.

According to still another aspect of the present invention, there is provided a master-slave conversion method, including: receiving a master-slave conversion notice indicating that a first unit has been converted into slave; determining whether a bus is usable; and generating master-slave conversion information and transmitting the information, when the bus is usable.

According to still another aspect, there is provided a bus system, including: a bus by which data from units of master status connected thereto are transferable to units of slave status connected thereto; a first convertible unit connected to the bus and being convertible between a master status and a slave status; and a second convertible unit connected to the bus and being convertible between the master status and a slave status. The first unit is converted from a master to a slave when a first amount of data received by the first unit is sufficient to accomplish a first specified task, the second unit is converted from a slave into a master and actively uses the bus when the first unit is a slave and the bus is usable by the first unit, and the first unit is re-converted from a slave to a master when a second amount of data received by the first unit is not sufficient to accomplish a second task.

According to still another aspect, there is provided a bus use method, including: determining whether a bus is in use; and converting a first unit from a slave status into a master status. The first unit uses the bus after it is converted and the bus is not in use.

According to still another aspect of the present invention, there are provided computer readable storage media encoded with processing instructions for causing a processor to perform the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
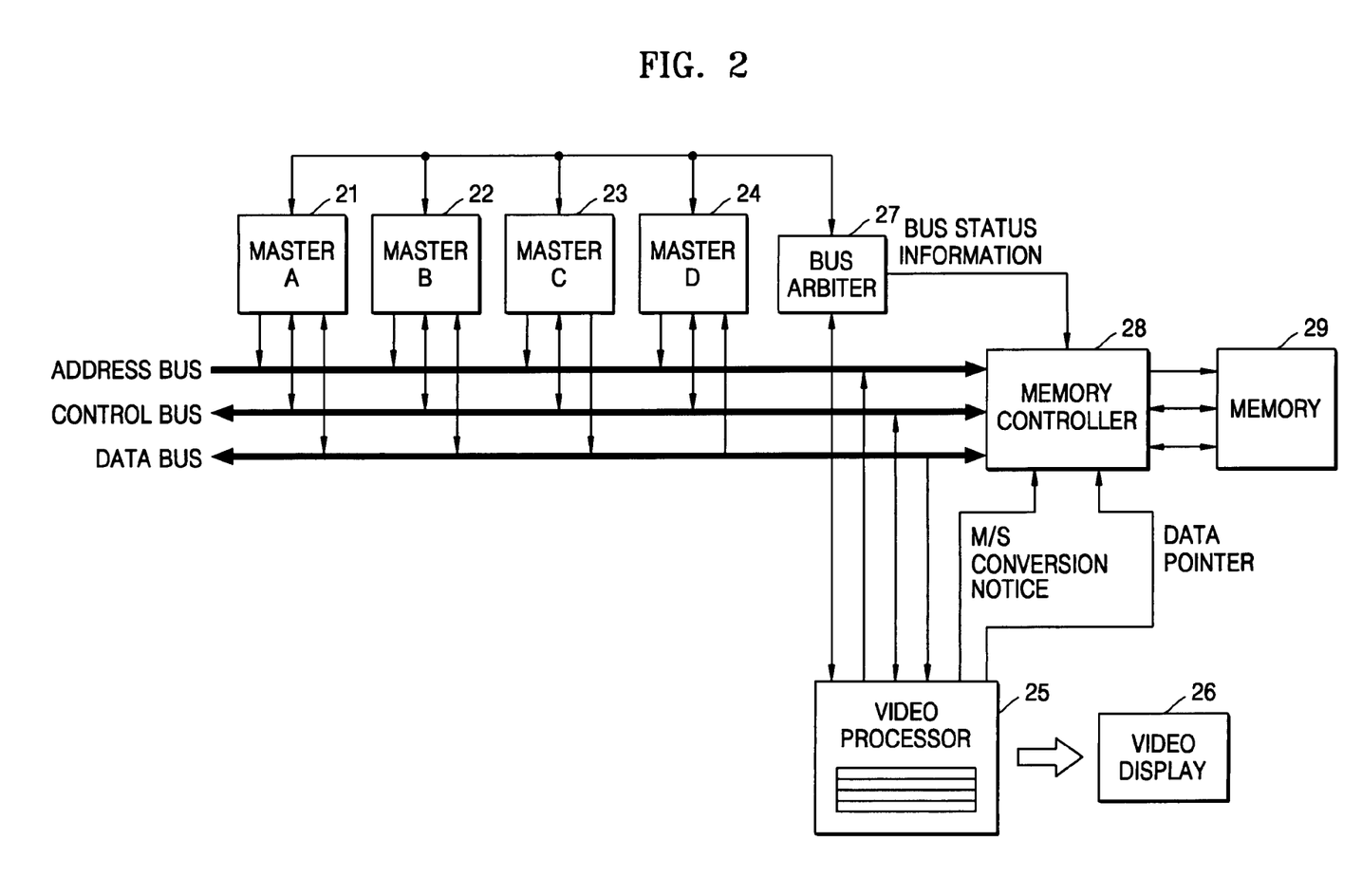
FIG. 2 is a block diagram showing a bus system according to an embodiment of the present invention.

Referring to FIG. 2, the bus system according to an embodiment of the present invention includes masters A-D respectively denoted by reference numerals 21-24, a video processor 25, a video display 26, a bus arbiter 27, a memory controller 28, and a memory 29. The video processor 25 corresponds to a master, and the memory controller 28 corresponds to a slave. However, it is to be understood that the video processor 25 can be converted from a master into a slave, and the memory controller 28 can be converted from a slave into a master. Hereinafter, the present embodiment is described in a case where the video processor 25 is converted into the slave The video processor 25 reads data from the memory 29 through the memory controller 28 and transmits the read data to the video display 26. The memory 29 may be a typical synchronous dynamic random access memory (SDRAM), and the memory controller 28 may be a SDRAM controller. The video display 26 typically uses a progressive scan method. Therefore, in order for the video display 26 to output a stable image, the video processor 25 transmits video data to the video display 26 with a constant data rate. For this purpose, a buffer inside of the video processor 25 must store sufficient data. Once sufficient data are stored in the buffer inside of the video processor 25, and the data amount stored in the buffer is constantly maintained so as to output a stable image, the video processor 25 may intermittently receive a small amount of data by way of an idle (non-used) bus only during a period when the bus is idle needless of obtaining a bus use permission from the arbiter 27 and receiving the data amount corresponding to a burst length. In order to transmit data by way of the idle bus, the memory controller 28 corresponding to a slave is converted into a master, and the video processor 25 corresponding to a master is converted into a slave. The memory controller 28 converted into a master transmits data to the video processor 25 by actively using the bus, and the video processor 25 converted into a slave receives the transmitted data from the memory 29 by passively using the bus. In this case, in order that the video processor 25 receives data from the slave, it is needed to inform that the video processor 25 has been converted into a slave. For this purpose, the video processor 25 transmits a master-slave conversion notice, informing that the data stored in the buffer are sufficient for the video display 26 to output a stable image and the video processor 25 has been converted into a slave, to the memory controller 28.

The video processor 25 transmits a data pointer as well as the master-slave conversion notice to the memory controller 28. As used in this description, the data pointer is a data position in the memory 29, the data being followed by the data which have been stored in the buffer inside of the video processor 25, that is, the data which will be read from the memory 29 by the video processor 25. Typically, an initial address corresponds to the data pointer. Since the present embodiment relates to the case that the video processor 25 intermittently receives a small amount of data by way of an idle bus, the memory controller receives bus status information from the bus arbiter 27 in order to determine whether or not there is a bus use request from the masters 21-24 except for the video processor 25 converted into a slave to the arbiter 27.

Figure 3:
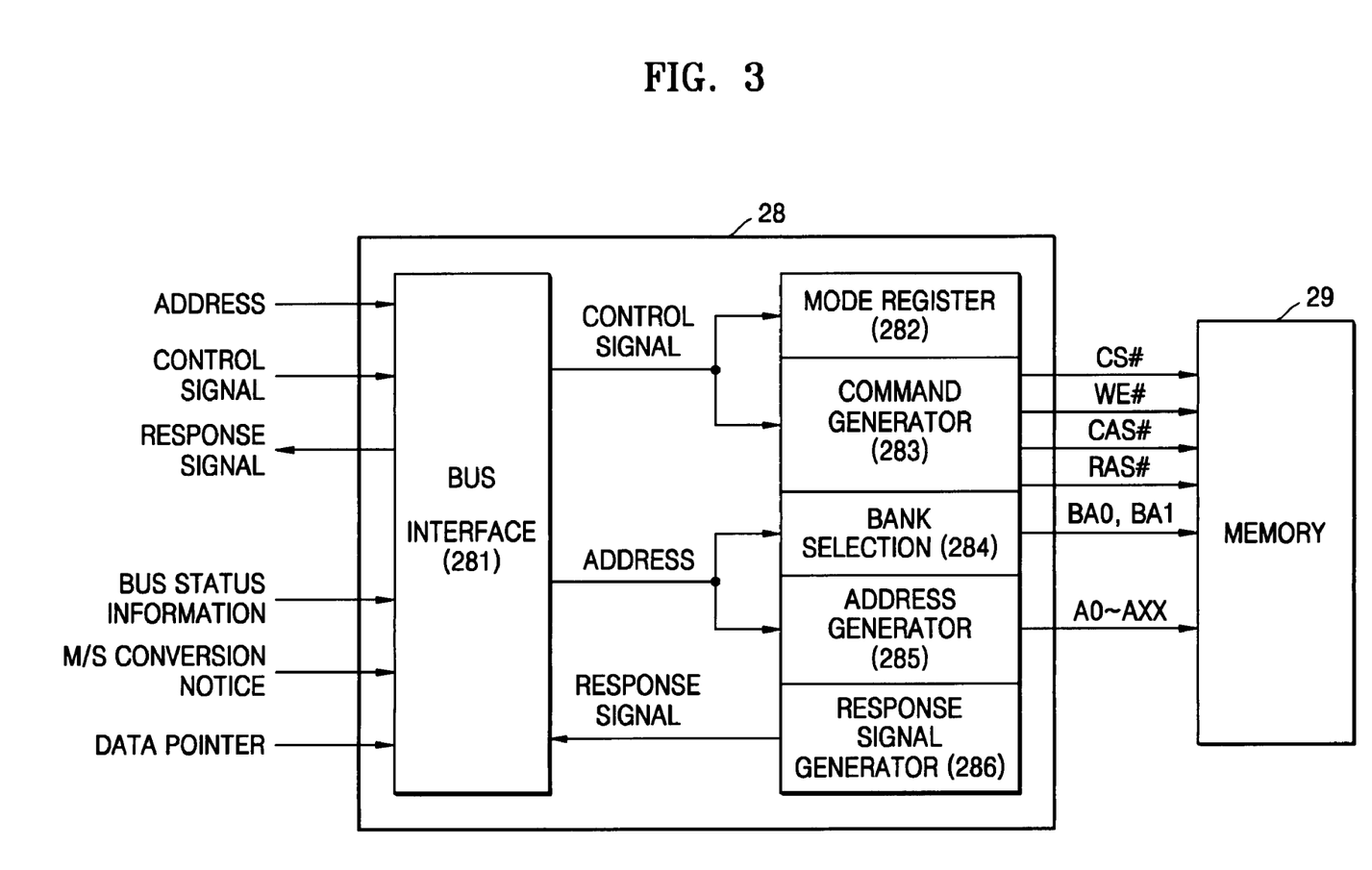
FIG. 3 is a block diagram showing the memory controller 28 of FIG. 2.

Referring to FIG. 3, the memory controller 28 of FIG. 2 includes a bus interface 281, a mode register 282, a command generator unit 283, a bank selection unit 284, an address generator unit 285, and a response signal generator unit 286.

In addition to a conventional function of controlling bus use timings according to properties of the bus, the bus interface 281 converts the memory controller 28 corresponding to a slave into a master. Currently, a variety of bus types, such as a peripheral component interconnect (PCI) bus and an industry standard architecture (ISA) bus, are available. In addition, an address bus, a control bus, and a data bus can be implemented by one line as well as a plurality of separate lines. The target system also should be designed based on the selected bus type. For example, a PCI bus in which addresses and data are time-divided and then transmitted by way of one line may be used. More specifically, by way of the PCI bus, the address is transmitted in a first cycle and then a piece of data is transmitted in the subsequent cycle. In the case that a large amount of data must be transmitted by way of the PCI bus, an initial address is transmitted in a first cycle, and then an amount of data may be continuously transmitted in the subsequent cycles of a specified number. The data continuously transmitted in a specified number of cycles is called "burst." The bus interface 281 basically has such a function for controlling bus use timings according to properties of the bus.

For information for converting the memory controller 28 corresponding to a slave into a master, the bus interface 281 receives bus status information from the bus arbiter 27, and also receives a master-slave conversion notice and a data pointer from the video processor 25. In addition, the bus interface 281 generates data read information, that is, addresses and control signals, for reading specified data from the memory 29 based on the received bus status information, the master-slave conversion notice, and the data pointer. Also, the bus interface 281 outputs the addresses and the control signals which have been received by the memory controller 28 as a slave or generated by the memory controller 28 as a master to the mode register 282, a command generator unit 283, a bank selection unit 284, and an address generator unit 285.

The mode register 282 stores, for example, a burst length, a read/write delay time, an operation mode. The command generator unit 283, the bank selection unit 284, and the address generator unit 285 refers to the mode register 282 to accomplish corresponding tasks. The command generator unit 283 generates a chip selection signal CS#, a write enable signal WE#, a column address strobe CAS, and a row address strobe RAS based on the received control signals and transmits them to the memory 29.

The bank selection unit 284 selects a bank of the memory 29 based on the received control signals and addresses. The address generator unit 285 generates an address of a memory storing data to be read based on the received control signals and addresses. The response signal generator unit 286 generates a response signal notifying the masters 21-25 (masters A-D and the video processor 25) that the data will be transmitted before transmitting the data and transmits the response signal to the memory controller 28. More specifically, the response signal generator unit 286 transmits the response signal to one of the masters 21-25 before the data are loaded on the data bus, that is, just before the values generated by the command generator unit 283, the bank selection unit 284, and the address generator unit 285 are output to the memory 29.

Figure 4:
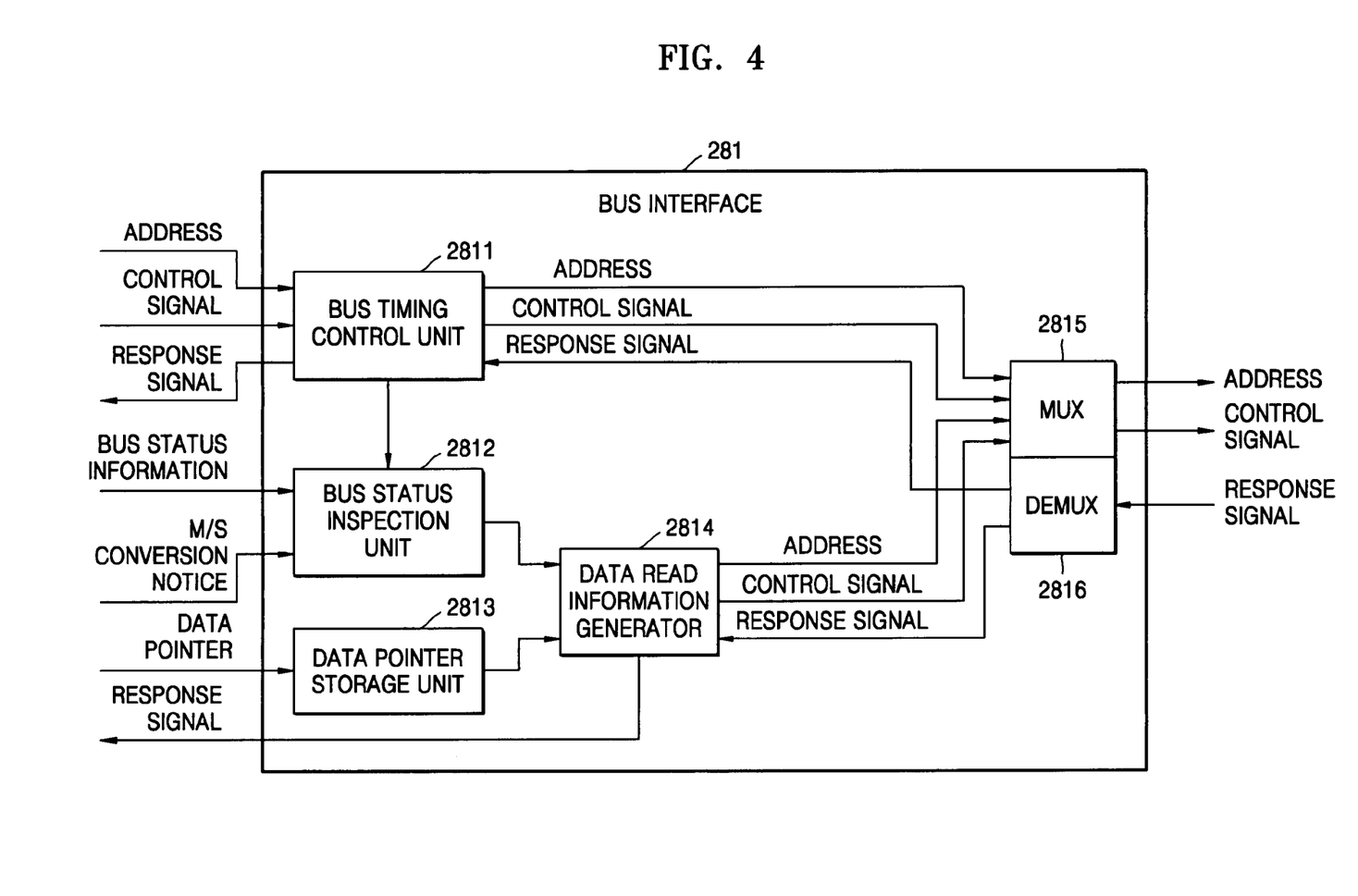
FIG. 4 is a block diagram showing the bus interface 281 of FIG. 3.

Referring to FIG. 4, the bus interface 281 of FIG. 3 includes a bus timing control unit 2811, a bus status inspection unit 2812, a data pointer storage unit 2813, a data read information generator unit 2814, a multiplexer (MUX) 2815, and a de-multiplexer (DMUX) 2816. Since the bus interface 281 in FIG. 4 is a component of the memory controller 28, it is easier to explain and more logical to give following description from a view point where the memory 29 is converted into a master than that a corresponding memory controller 28 is converted into a master. Therefore, FIG. 4 will be described in a condition where the memory 29 is converted into a master.

The bus timing control unit 2811 receives the data read information transmitted from the master obtaining a bus use permission from the bus arbiter 27 by way of the bus, and transmits the data read information received in the use timings according to properties of the bus to the memory 29 corresponding to a slave. In this description, the data read information is a control signal for instructing data read operation and informing an address of the memory 29. The data read information is received by the bus timing control unit 2811 by way of an address bus and a control bus. For example, the bus timing control unit 2811 transmits the data read information received in use timings according to a PCI bus property to the memory 29. In other words, the bus timing control unit 2811 transmits the address to the memory 29 in the cycle allocated to transmit the address and the control signal to the memory 29 in the cycle allocated to transmit the control signal.

When the bus status inspection unit 2812 receives the master-slave conversion notice informing that the video processor 25 has been converted into a slave, from the video processor 25 corresponding to a master, the bus status inspection unit 2812 starts to inspect the bus status, and then outputs a master-slave conversion instruction instructing to convert the memory 29 into a master in order to allow the memory 29 corresponding to a slave to use the bus if the bus is found to be idle as a result of the inspection. More specifically, the bus status inspection unit 2812 inspects use timings in the bus timing control unit 2811 and determines whether or not there is a time slot in which the video processor 25 can read the data to be read from the memory 29. Then, if it is determined that there is a time slot for reading data as a result, the bus status inspection unit 2812 determines whether or not there is a bus use request transmitted to an arbiter 27 from the master having a higher priority than a level to which a system designer has assigned among the masters except for the video processor 25 converted into a slave. When there is no bus use request as a result, the master-slave conversion instruction is output.

Generally, the master-slave conversion instruction is output only when none of masters 21-24 are using the bus. However, with respect to the masters having a higher priority than a specified level, the master-slave conversion instruction can be designed not to be output when the masters having a higher priority request bus use.

The data pointer storage unit 2813 receives the data pointer designating a position storing a predetermine data in the memory 29 from the video processor 25 and stores the receive data pointer. The video processor 25 transmits the data pointer as well as the master-slave conversion notice to the memory controller 28. Herein, the data pointer is a data position in the memory 29, the data being followed by the data which have been stored in a buffer inside of the video processor 25, that is, the data which will be read from the memory 29 by the video processor 25. Typically, an initial address corresponds to the data pointer.

The data read information generator unit 2814 generates data read information for reading specified data from the memory 29 when the master-slave conversion instruction output from the bus status inspection unit 2812 is input, and then transmits the generated data read information to the memory 29. More specifically, the data read information generator unit 2814 generates a next address and a control signal instructing data read operation based on the data pointer stored in the data pointer storage unit 2813, that is, the initial address, and transmits the generated address to the bank selection unit 284 and the address generator unit 285, and then transmits the control signal instructing data read operation to the mode register 282 and the command generator unit 283. The data read information generator unit 2814 may include a buffer inside of it to store the generated data read information in the buffer and then output the stored data read information in an appropriate timing. Particularly, the buffer inside of the data read information generator unit 2814 is needed for the following case. Data transmission must be interrupted when the master having a higher priority than a specified level starts to use the bus during data are transmitted from the memory converted into a master to the video processor 25 converted into a slave. In this case, a final address of a current transmitting data is stored in the buffer inside of the data read information generator unit 2814 and then the data transmission is restarted from the address stored in the buffer when the bus use by the master is terminated.

The MUX 2815 selectively receives the data read information transmitted from the bus timing control unit 2811 and the data read information generator unit 2814, and transmits the selectively received data read information to the memory 29. The memory which has received the data read information transmitted from the MUX 2815 transmits the data designated by the data read information to one of the masters 21-25. More specifically, when the memory 29 receives the initial address transmitted from the bus timing control unit 2811 and the control signal instructing data read operation, a data amount corresponding to a burst length is transmitted to one of the masters 21-24 except for the video processor 25 starting at the received initial address. When the memory 29 receives the initial address transmitted from the data read information generator unit 2814 and the control signal instructing data read operation, the data are transmitted to the video processor 25 only during the bus is idle. In this case, the memory transmits response signals before starting to transmit data in order to notifying that the data will be transmitted to the masters 21-25 (masters A-D and the video processor 25).

The DEMUX 2816 receives the response signals transmitted from the memory 29 and classifies the received response signals to transmit the response signals for the data read information transmitted from the bus timing control unit 2811 to the bus timing control unit 2811 and the response signals for the data read information transmitted from the data read information generator unit 2814 to the data read information generator unit 2814.

Figure 5:
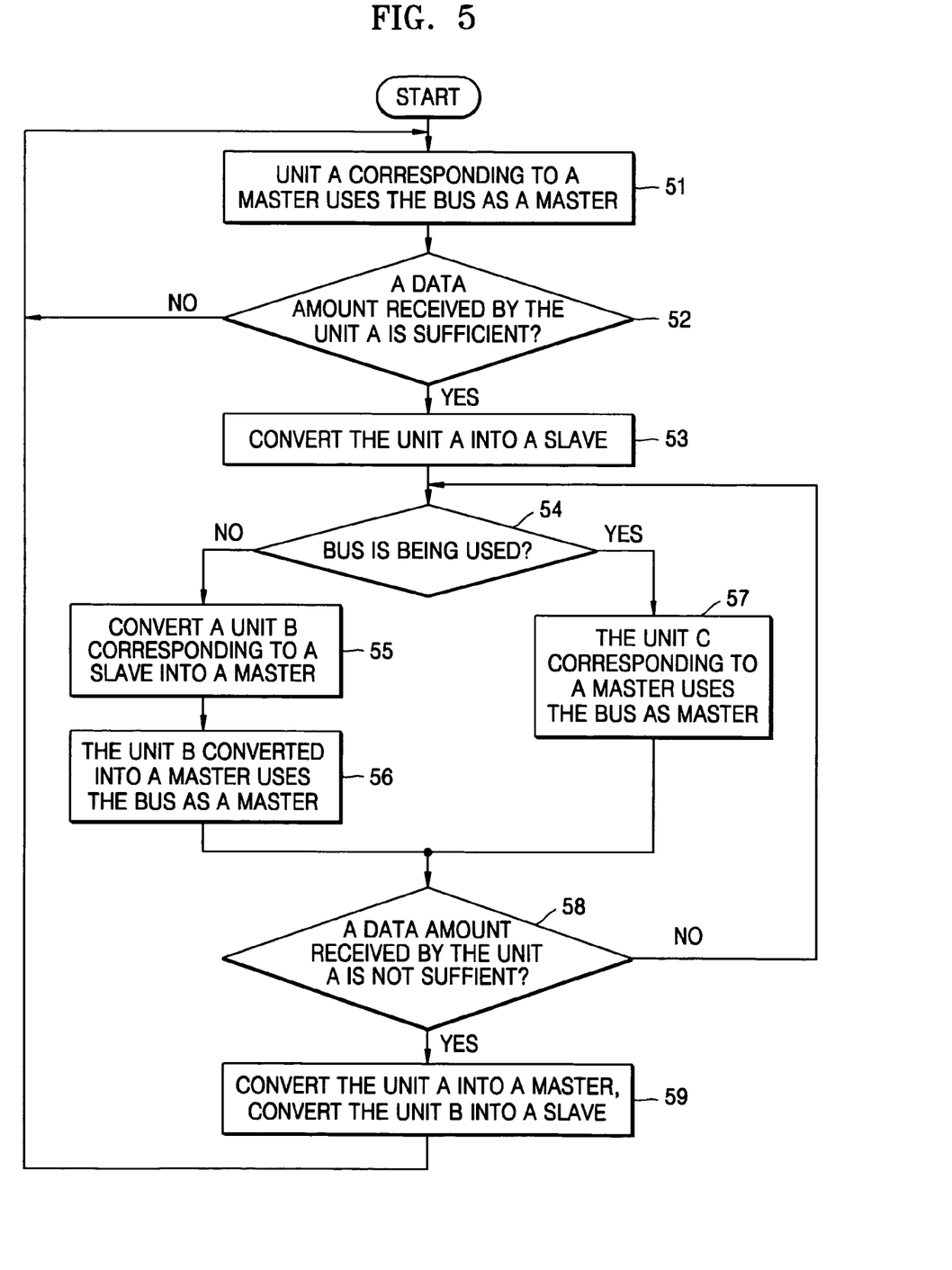
FIG. 5 is a flowchart showing a method of using a bus according to an embodiment of the present invention.

Referring to FIG. 5, a method of using a bus according to an embodiment of the present invention includes several steps, which are performed in the bus system of FIG. 2. Hereinafter, in the description of the method of using a bus shown in FIG. 5, the present embodiment will be described in the context of a non-limiting example, by regarding the unit A as the video processor 25, the unit B as the memory controller 28, and the unit C as the masters except for the video processor 25. Thus, it is to be understood that the masters except for such a video processor 25 may be converted into slaves.

Among the masters 21-25 (masters A-D and the video processor 25), the video processor 25 obtaining a bus use permission from the arbiter 27 uses the bus as a master to transmit data to the device B corresponding to a slave or receive data from the memory controller 28 corresponding to a slave (operation 51). Subsequently, if the data amount received by the video processor 25 is sufficient to accomplish a specified task (step 52), that is, the data amount sufficient to output a stable image is stored in the buffer inside of the video processor 25, the video processor 25 corresponding to a master is converted into a slave in order to interrupt the bus use request by the video processor 25 (step 53).

Subsequently, when the video processor 25 is converted into a slave, it is determined whether or not the unit obtaining a bus use permission from the arbiter 27 among the masters 21-24 except for the video processor 25 uses the bus as a master to transmit data to a memory controller 28 corresponding to a slave or receive data from the memory controller 28 corresponding to a slave. If it is determined that the bus is idle (operation 54), the memory controller 28 corresponding to a slave is converted into a master during the bus idle period in order to allow the memory controller 28 to use the bus as a master (operation 55). Then, the memory controller 28 converted into a master transmits data to the video processor which is one of a plurality of units or receives data from the video processor 25 by way of the bus as a master.

If it is determined that the bus is used (operation 54), this condition corresponds to the case where one of the masters 21-24 except for the video processor 25 uses the bus as a master, and the memory controller 28 functions as a slave (operation 57). Subsequently, if the data received by the video processor 25 is not sufficient to accomplish a specified task (operation 58), for example, the buffer inside of the video processor 25 does not store a data amount sufficient for the video display 26 to output a stable image, the video processor 25 converted into a slave is re-converted into a master in order to allow the video processor 25 to request bus use (operation 59). Then, the method returns to operation 51.

Figure 6:
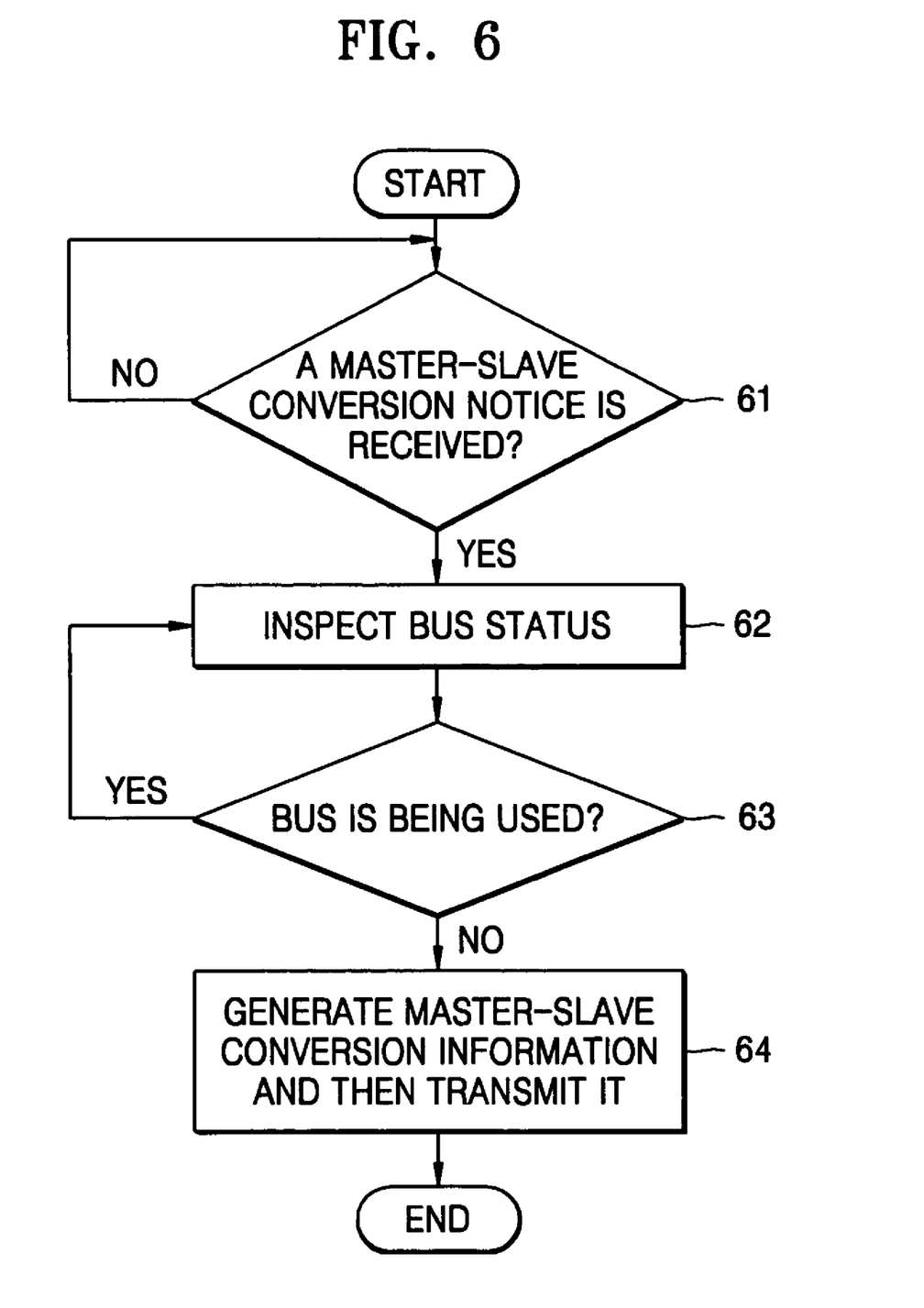
FIG. 6 is a flowchart showing a master-slave conversion method according to an embodiment of the present invention.

Referring to FIG. 6, the master-slave conversion method according to the present embodiment includes several operations, which are accomplished in the bus interface of FIG. 4. Since the master-slave conversion method in FIG. 6 shows operations which are accomplished inside of the memory controller 28, it is easier to understand and more logical to give following description from a view point where the memory 29 is converted into a master than that the memory controller 28 is converted into a master. Therefore, FIG. 6 will be described in a condition where the memory 29 is converted into a master.

If a master-slave conversion notice informing that the video processor 25 has been converted into a slave is received from the video processor 25, the bus status is inspected (operation 62). Herein, the master-slave conversion notice is a signal representing that the data received by the video processor 25 are sufficient to accomplish a specified task and the video processor 25 corresponding to a master has been converted into a slave. If it is determined that the bus can be used, i.e., the bus is idle as result of inspecting the bus status (operation 63), the master-slave conversion information for converting the memory 29 into a master is generated, and the generated master-slave conversion information is transmitted to the video processor 25 in order to allow the memory 29 corresponding to a slave to use the bus as a master. If it is determined that the bus cannot be used, the method returns to operation 62.

In this description, the master-slave conversion information is a kind of data read information for reading specified data from the memory 29 converted into a master. The data read information includes a control signal instructing read operation and informing a corresponding memory address. More specifically, use timings according to properties of the bus are inspected to determine whether or not there is a time slot for reading specified data from the memory 29 by way of the bus. If there is a time slot for reading specified data as a result of the inspection, it is determined whether or not there is a bus use request from the master having a higher priority than a specified level to the arbiter 27. If it is determined that there is no bus use request as a result, the master-slave conversion information is generated.

Embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

According to the above-described embodiments of the present invention, it is possible to efficiently use a bus because data are actively transmitted from a memory controller (or a memory) converted from a slave into a master to a unit converted from a master into a slave a period when no master uses the bus. Since this reduces the number of bus use requests from the unit converted from a master into a slave to the arbiter, a chance for other units corresponding to masters to send the bus use request to an arbiter is increased correspondingly. Therefore, it is possible to remove a bottleneck caused by congested bus use requests. In addition, since data can be actively transmitted by a memory controller (or a memory) recognizing the timing when the bus is idle, it is possible to transmit data to other units corresponding to masters in more accurate timings.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of using a bus, comprising:
   determining whether a subject unit among a plurality of units corresponding to masters obtaining a bus use permission from an arbiter uses the bus as a master to transfer data to/from a first unit corresponding to a slave;
   converting the first unit into a master when the subject unit does not use the bus in order to allow the first unit to use the bus as a master, when the subject unit is determined not to be using the bus,
   allowing a second unit obtaining the bus use permission from an arbiter among the plurality of units corresponding to masters to use the bus as a master to transfer data to/from the first unit corresponding to a slave; and
   converting the second unit corresponding to a master into a slave in order to interrupt the bus use request from the second unit when a data amount received by the second unit is sufficient to accomplish a specified task.

2. The method according to claim 1, further comprising transferring data to/from a second unit of the plurality of units by allowing the first unit converted into a master to use the bus as a master.

3. The method according to claim 1, wherein the determining includes determining, when the second unit is converted into a slave, whether the subject unit uses the bus to transfer data to/from the first unit corresponding to a slave.

4. The method according to claim 3, wherein the method further comprises re-converting the first unit converted into a slave into a master in order to allow the first unit to request bus use when the data amount received by the first unit is not sufficient to accomplish a specified task, and
   wherein the method returns to the determining after the first unit is re-converted into a master.

5. A bus interface comprising:
   a bus status inspection unit which inspects a bus status and then outputs a master-slave conversion instruction indicating that a first unit corresponding to a slave is to be converted into a master in order to allow the first unit to use the bus as a master, when it is determined that the bus is idle as a result of the inspection; and
   a data read information generator unit which generates data read information for reading specified data from the first unit converted into a master, when the master-slave conversion instruction output from the bus status inspection unit is received, and which transmits the generated data read information to the first unit,
   wherein a second unit obtaining the bus use permission from an arbiter among the plurality of units corresponding to masters is allowed to use the bus as a master to transfer data to/from the first unit corresponding to a slave; and
   the second unit corresponding to a master is converted into a slave in order to interrupt the bus use request from the second unit when a data amount received by the second unit is sufficient to accomplish a specified task.

6. A master-slave conversion method comprising:
   inspecting bus status when a master-slave conversion notice indicating that a first unit corresponding to a master has been converted into a slave is received from the first unit; and
   generating master-slave conversion information for converting a second unit corresponding to a slave into a master in order to allow the second unit to use the bus as a master when it is determined that the bus is idle as a result of the inspecting, and transmitting the master-slave conversion information to the second unit,
   wherein the master-slave conversion notice indicates that the first unit corresponding to a master has been converted into a slave because a data amount received by the first unit is sufficient to accomplish a specified task.

7. The master-slave conversion method according to claim 6, wherein the master-slave conversion information is data read information for reading specified data from the second unit converted into a master.

8. The master-slave conversion method according to claim 7, wherein the second unit is a memory, and the data read information includes a control signal for a data read operation and which indicates an address of the second unit.

9. The master-slave conversion method according to claim 6, wherein the determining includes inspecting bus use timings according to properties of the bus to determine whether there is a time slot for allowing specified data to be read via the bus.

10. The master-slave conversion method according to claim 9, wherein the determining includes:
    inspecting whether there is a bus use request from a master having a higher priority than a specified level to an arbiter when the time slot is determined to be present; and
    generating the master-slave conversion information when there is no bus use request.

11. A computer readable storage medium having a computer program stored thereon encoded with processing instructions to control a computer to cause a microprocessor to implement the instructions, comprising:
    determining whether a subject unit among a plurality of units corresponding to masters obtaining a bus use permission from an arbiter uses the bus as a master to transfer data to/from a first unit corresponding to a slave; and
    converting the first unit into a master when the subject unit does not use the bus in order to allow the first unit to use the bus as a master, when the subject unit is determined not to be using the bus,
    allowing a second unit obtaining the bus use permission from an arbiter among the plurality of units corresponding to masters to use the bus as a master to transfer data to/from the first unit corresponding to a slave; and converting the second unit corresponding to a master into a slave in order to interrupt the bus use request from the second unit when a data amount received by the second unit is sufficient to accomplish a specified task.

12. A computer readable storage medium having a computer program stored thereon encoded with processing instructions to control a computer to cause a microprocessor to execute a master-slave conversion method, the instructions comprising:

inspecting bus status when a master-slave conversion notice indicating that a first unit corresponding to a master has been converted into a slave is received from the first unit; and generating master-slave conversion information for converting a second unit corresponding to a slave into a master in order to allow the second unit to use the bus as a master when it is determined that the bus is idle as a result of the inspecting, and transmitting the master-slave conversion information to the second unit, wherein the master-slave conversion notice indicates that the first unit corresponding to a master has been converted into a slave because a data amount received by the first unit is sufficient to accomplish a specified task.

13. A method of decreasing bus congestion, comprising:

converting a first unit from a master to a slave, when a first amount of data received by the first unit is sufficient to accomplish a first specified task;

determining whether a bus is usable by the first unit;

converting a second unit from a slave into a master and actively using the bus via the second unit, when the bus is usable by the first unit;

actively using the bus via a third unit, when the bus is not usable by the first unit;

determining, after the converting and the using, whether a second amount of data received by the first unit is sufficient to accomplish a second task; and re-converting the first unit from a slave to a master, when the second amount of data is sufficient to accomplish the second task, wherein the second unit obtaining the bus use permission from an arbiter among the plurality of units corresponding to masters is allowed to use the bus as a master to transfer data to/from the first unit corresponding to a slave; and the second unit corresponding to a master is converted into a slave in order to interrupt the bus use request from the second unit when a data amount received by the second unit is sufficient to accomplish a specified task.

14. The method of claim 13, wherein the first unit is a video processor and the tasks are outputting stable images.

15. A master-slave conversion method, comprising:

receiving a master-slave conversion notice indicating that a first unit has been converted into slave;

determining whether a bus is usable; and generating master-slave conversion information and transmitting the information, when the bus is usable, wherein the master-slave conversion notice indicates that the first unit corresponding to a master has been converted into a slave because a data amount received by the first unit is sufficient to accomplish a specified task.

16. The method of claim 15, wherein the unit is a memory or a memory controller.

17. The method of claim 15, wherein the method is performed in a bus interface.

18. A bus system, comprising:

a bus by which data from units of master status connected thereto are transferable to units of slave status connected thereto;

a first convertible unit connected to the bus and being convertible between a master status and a slave status; and a second convertible unit connected to the bus and being convertible between the master status and a slave status;

wherein a first unit is converted from a master to a slave when a first amount of data received by the first unit is sufficient to accomplish a first specified task, wherein a second unit is converted from a slave into a master and actively uses the bus when the first unit is a slave and the bus is usable by the first unit, wherein the first unit is re-converted from a slave to a master when a second amount of data received by the first unit is not sufficient to accomplish a second task, wherein the second unit obtaining the bus use permission from an arbiter among the plurality of units corresponding to masters is allowed to use the bus as a master to transfer data to/from the first unit corresponding to a slave; and wherein the second unit corresponding to a master is converted into a slave in order to interrupt the bus use request from the second unit when a data amount received by the second unit is sufficient to accomplish a specified task.

19. A bus use method, comprising:

determining whether a bus is in use; and converting a first unit from a slave status into a master status, wherein the first unit uses the bus after it is converted and the bus is not in use, allowing a second unit obtaining the bus use permission from an arbiter among the plurality of units corresponding to masters to use the bus as a master to transfer data to/from the first unit corresponding to a slave; and converting the second unit corresponding to a master into a slave in order to interrupt the bus use request from the second unit when a data amount received by the second unit is sufficient to accomplish a specified task.

* * * * *